United States Patent
Wang et al.

(10) Patent No.: US 8,264,650 B2
(45) Date of Patent: Sep. 11, 2012

(54) LIQUID CRYSTAL DISPLAY

(75) Inventors: Chun-Jui Wang, Tainan County (TW); Chien-Hong Chen, Tainan County (TW); Chih-Yung Hsieh, Tainan County (TW); Heng-Hsien Li, Tainan County (TW); Wei-Ting Hsu, Tainan County (TW)

(73) Assignee: Chimei Innolux Corporation, Miao-Li County (TW)

( * ) Notice: Subject to any disclaimer, the term of this patent is extended or adjusted under 35 U.S.C. 154(b) by 459 days.

(21) Appl. No.: 12/507,904

(22) Filed: Jul. 23, 2009

(65) Prior Publication Data
US 2010/0026948 A1  Feb. 4, 2010

(30) Foreign Application Priority Data
Jul. 30, 2008 (TW) .............................. 97128851 A

(51) Int. Cl.
*G02F 1/1343* (2006.01)
*G02F 1/1337* (2006.01)

(52) U.S. Cl. .................. 349/139; 349/123; 349/129
(58) Field of Classification Search .................. 349/139, 349/123–129
See application file for complete search history.

(56) References Cited

U.S. PATENT DOCUMENTS

| | | | |
|---|---|---|---|
| 6,300,996 B1 * | 10/2001 | Matsuyama et al. | 349/144 |
| 6,654,090 B1 * | 11/2003 | Kim et al. | 349/129 |
| 6,879,364 B1 * | 4/2005 | Sasaki et al. | 349/129 |
| 7,113,241 B2 * | 9/2006 | Hanaoka | 349/139 |

FOREIGN PATENT DOCUMENTS
TW  571154  1/2004

OTHER PUBLICATIONS
English language translation of abstract of TW 571154 (published Jan. 11, 2004).

* cited by examiner

*Primary Examiner* — Dung T. Nguyen
(74) *Attorney, Agent, or Firm* — Thomas|Kayden

(57) ABSTRACT

A liquid crystal display includes a first substrate, a second substrate and a liquid crystal layer. The first substrate has a pixel electrode having many first slits and many second slits, connected to a third slit. Each first and second slit respectively stretches along a first and a second vector with a starting point in a junction with the third slit. Liquid crystal molecules near an alignment layer of the second substrate is aligned by the alignment layer to pre-tilt. Each projection of the long-axis of at least part of the pre-tilted liquid crystal molecules on the second substrate forms a third vector with a starting point at the end of the liquid crystal molecule near the alignment layer. An included angle between the first and the third vector is $\theta 1$, and an included angle between the second and the third vector is $\theta 2$. $90°<\theta 1<160°$, and $90°<\theta 2<160°$.

13 Claims, 10 Drawing Sheets

LIQUID CRYSTAL DISPLAY

TECHNICAL FIELD

The present disclosure relates to a display device and more particularly to a liquid crystal display (LCD).

BACKGROUND

The rapid development of multimedia society mostly benefits from the tremendous progress in semiconductor devices or display devices. Among the display devices, LCDs having superior characteristics of high definition, great space utilization, low power consumption, and non-radiation have gradually become mainstream products in the market.

To date, the liquid crystal displays (LCDs) with high contrast ratio, no gray scale inversion, low color shift, high luminance, full color, high color saturation, high responsive speed, and wide viewing angles are required on the market. In order to provide the wide viewing angles, some displays, such as twisted nematic (TN) liquid crystals with wide-viewing films, in-plane switching (IPS) LCDs, fringe field switching (FFS) LCDs, and multi-domain vertically alignment (MVA) LCDs, have been developed.

However, when producing TN LCDs, two alignment layers are required to align liquid crystal molecules in the liquid crystal layer, which takes longer processing time and costs more. Besides, TN LCDs have disadvantages such as asymmetrical viewing angles, higher luminance in the dark state and lower contrast. Disadvantages such as lower light transmittance, lower responsive speed and higher color shift exist in vertically alignment LCDs.

SUMMARY OF THE DISCLOSURE

The present disclosure provides an LCD for improving the transmittance and the symmetrization of viewing angles.

A liquid crystal display (LCD) of the present disclosure has at least one pixel region. The LCD includes a first substrate, a second substrate, and a liquid crystal layer. The first substrate has at least one pixel electrode. The pixel electrode has a plurality of first slits, a plurality of second slits, and at least one third slit. The first slits and the second slits are connected to the third slit. Each first slit stretches along a first vector with a starting point in a junction of the first slit and the third slit. Each second slit stretches along a second vector with a starting point in a junction of the second slit and the third slit. The second substrate has a common electrode and an alignment layer which covers the common electrode. The liquid crystal layer is disposed between the pixel electrode of the first substrate and the alignment layer of the second substrate. The liquid crystal molecules of the liquid crystal layer near the alignment layer are aligned by the alignment layer to pre-tilt. Each projection of the long-axis of at least part of the pre-tilted liquid crystal molecules on the second substrate forms a third vector with a starting point at the end of the liquid crystal molecule near the alignment layer. The third slit is parallel to the direction of the third vector. The included angle between the first vector and the third vector is $\theta 1$ and the included angle between the second vector and the third vector is $\theta 2$, wherein $90°<\theta 1<160°$ and $90°<\theta 2<160°$.

In an embodiment of the LCD, $120°<\theta 1<150°$ and $120°<\theta 2<150°$.

In an embodiment of the LCD, $\theta 1=\theta 2$.

In an embodiment of the LCD, the pixel region is divided into a first region and a second region. The projection of the long-axis of the pre-tilted liquid crystal molecules of the first region on the second substrate forms a third vector with a starting point in the end of the liquid crystal molecule near the alignment layer. The projection of the long-axis of the pre-tilted liquid crystal molecules disposed in the second region on the second substrate forms a fourth vector with a starting point at the end of the liquid crystal molecule near the alignment layer. The direction of the third vector is parallel to the direction of the fourth vector, and both the third vector and the fourth vector are toward a common boundary line of the first region and the second region. For example, $\theta 1=\theta 2=90°$. In addition, the first slits and the second slits, for example, are disposed in the first region while the pixel electrode, for example, further has a plurality of fifth slits and a plurality of sixth slits. The fifth slits and the sixth slits are disposed in the second region and connected to the third slits respectively. Each fifth slit stretches along a fifth vector with a starting point in a junction of the fifth slit and the third slit. Each sixth slit stretches along a sixth vector with a starting point in a junction of the sixth slit and the third slit. The included angle between the third vector and the fifth vector is $\theta 5$ and the included angle between the third vector and the sixth vector is $\theta 6$, wherein $90°<\theta 5<160°$ and $90°<\theta 6<160°$. In addition, for example, $90°<\theta 1<160°$ and $90°<\theta 2<160°$. The pixel electrode further has a fourth slit disposed on the common boundary line of the first region and the second region and substantially stretching along the direction perpendicular to the third vector.

In an embodiment of the LCD, the included angle between the long-axis of the pre-tilted liquid crystal molecules and the direction of the normal of the second substrate is larger than 0° and smaller than or equal to 15°.

In an embodiment of the LCD, the LCD further includes a first polarizer and a second polarizer. The first polarizer is disposed on a surface of the first substrate away from the liquid crystal layer, while the second polarizer is disposed on a surface of the second substrate away from the liquid crystal layer. In addition, the absorption directions of the first polarizer and the second polarizer, for example, are substantially mutually-perpendicular.

In an embodiment of the LCD, the first substrate is an active device array substrate. Moreover, the first substrate has at least one color filter disposed in the pixel region.

In an embodiment of the LCD, the second substrate further has at least one color filter disposed in the pixel region.

In an embodiment of the LCD, the LCD further includes a backlight module on which the first substrate, the second substrate, and the liquid crystal layer are disposed.

In an embodiment of the LCD, the liquid crystal molecules in the liquid crystal layer are the negative type liquid crystal molecules.

Based on the above, according to the LCD in the embodiment of the present disclosure, the included angle between the slits and the pre-tilted direction is not a right angle so as to improve the transmittance of each pixel region. Additionally, there are two different pre-tilted directions of the liquid crystal molecules in each pixel region because of the alignment layer, and the symmetry of viewing angles is improved.

To make the above and other features and advantages of the present disclosure more comprehensible, several embodiments accompanied with figures are detailed as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1:
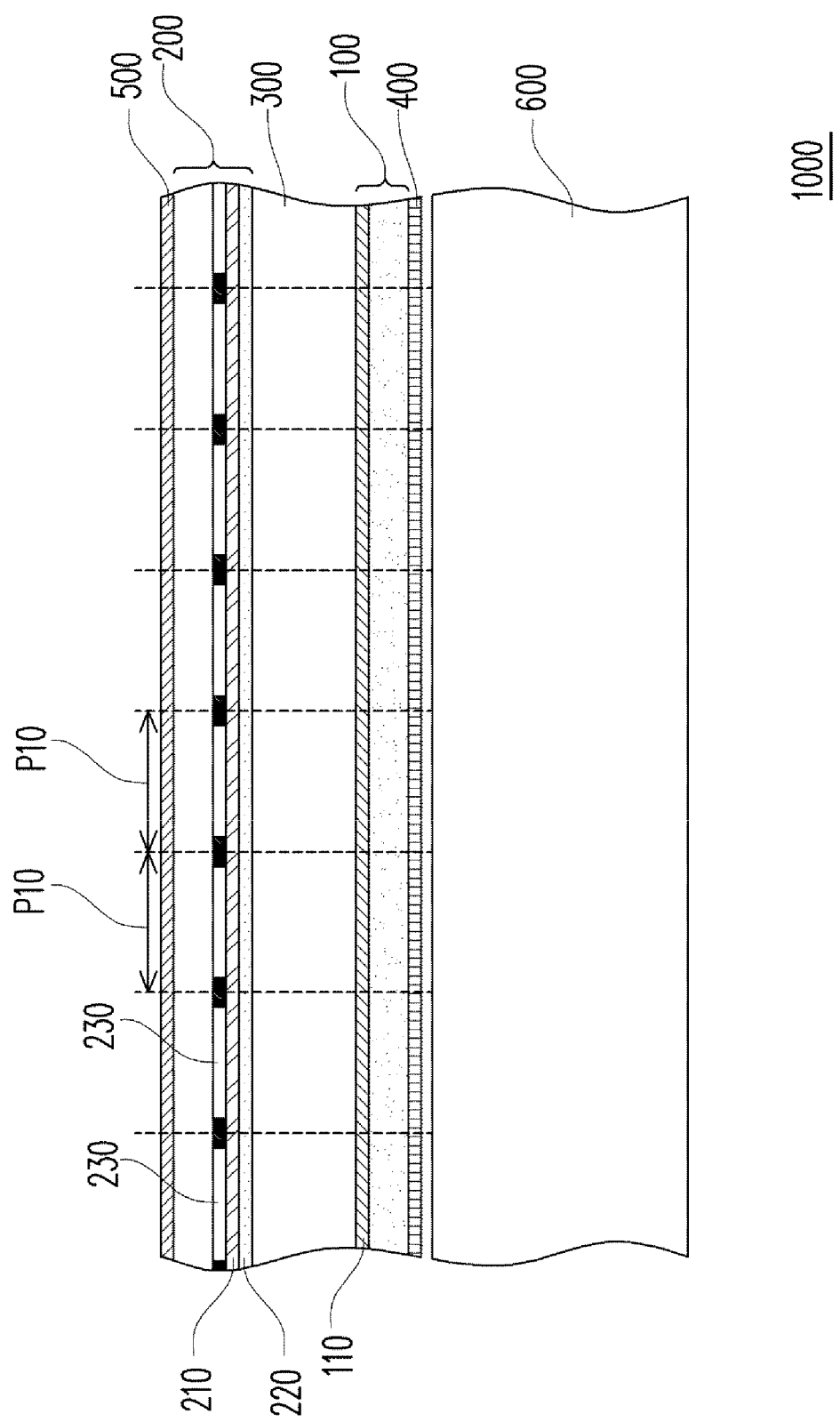
FIG. 1 is a partial cross-sectional view of an LCD according to an embodiment of the present disclosure.

FIG. 1 is a partial cross-sectional view of an LCD according to an embodiment of the present disclosure. Referring to FIG. 1, an LCD 1000 of the present embodiment includes a first substrate 100, a second substrate 200, and a liquid crystal layer 300. The LCD 1000 has at least one pixel region, and the LCD 1000 has a plurality of pixel regions P10 in the present embodiment. The liquid crystal layer 300 is disposed between the first substrate 100 and the second substrate 200, and the first substrate 100 is substantially parallel to the second substrate 200. The second substrate 200 has a common electrode 210 and an alignment layer 220. The alignment layer 220 covers the common electrode 210, and the alignment layer 220 is close to the liquid crystal layer 300.

Besides, the liquid crystal molecules of the liquid crystal layer 300, for example, are the negative type of liquid crystal molecules. The horizontal dielectric constant of the negative type of liquid crystal molecules is smaller than the vertical dielectric constant thereof. Therefore, when being affected by the electric field, the long-axis of the negative type of liquid crystal molecules will be perpendicular to the direction of the electric field. In addition, the LCD 1000, for example, further includes a first polarizer 400 and a second polarizer 500. The first polarizer 400 is disposed on a surface of the first substrate 100, and the surface is away from the liquid crystal layer 300. Namely, the first polarizer 400 and the liquid crystal layer 300 are respectively disposed on two opposite surfaces of the first substrate 100. The second polarizer 500 is disposed on a surface of the second substrate 200, and the surface is away from the liquid crystal layer 300. Namely, the second polarizer 500 and the liquid crystal layer 300 are respectively disposed on two opposite surfaces of the second substrate 200.

Moreover, the first substrate 100 can be an active device array substrate. That is, the first substrate 100 includes a scan line, a data line, an active device, a pixel electrode, etc. Further details of these devices are provided later on. Meanwhile, the first substrate 100 further has a plurality of color filter (not shown) respectively disposed on each pixel region P10. Or, the second substrate 200, for example, further has a plurality of color filters 230, respectively disposed on each pixel region P10. If the LCD 1000 is a transmissive LCD or a transflective LCD, a backlight module 600 can be further included in the LCD 1000 for providing a planar light source, and the first substrate 100, the second substrate 200, and the liquid crystal layer 300 are disposed on the backlight module 600.

Figure 2:
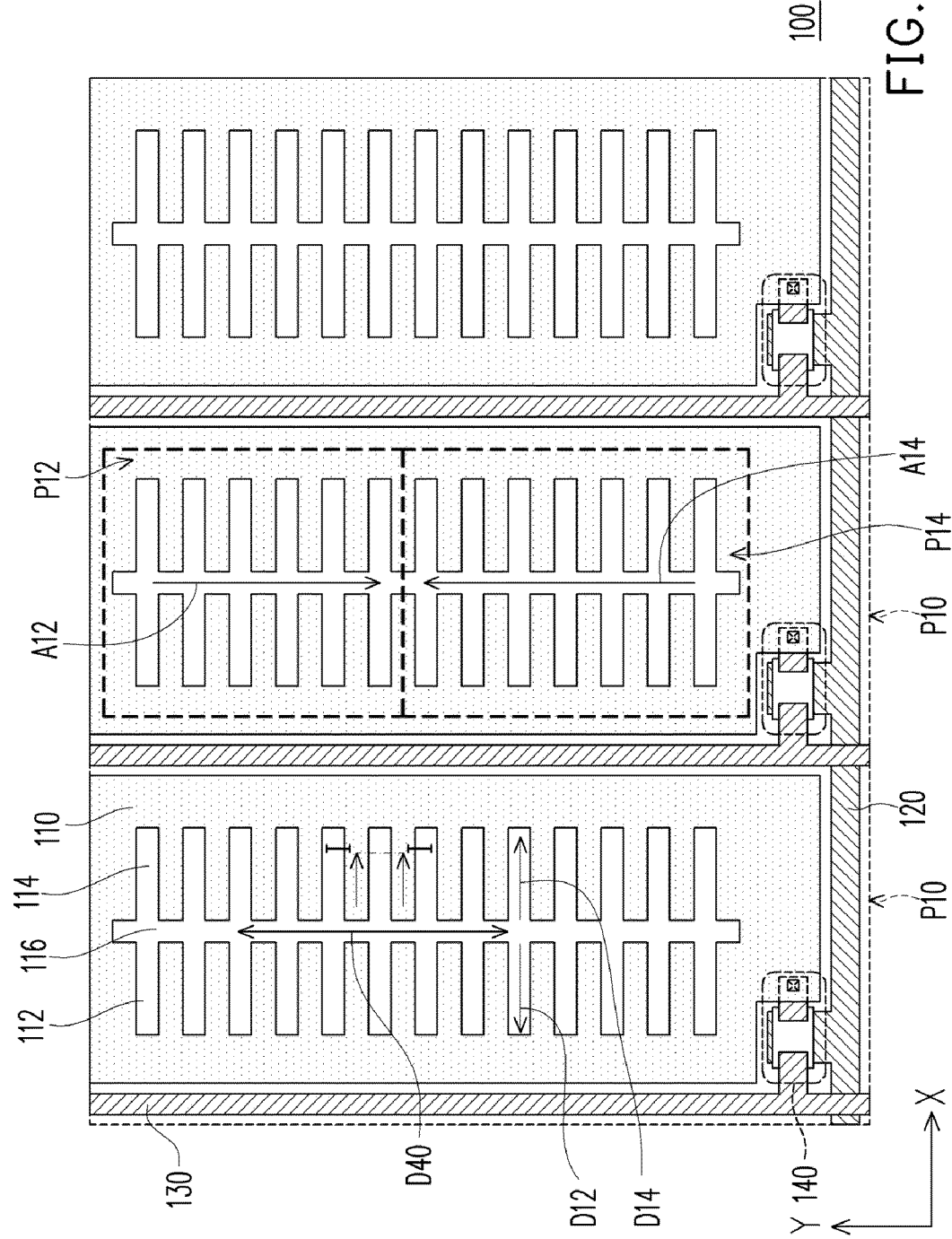
FIG. 2 is a partial top view of a first substrate of the LCD of FIG. 1.
Figure 3A:
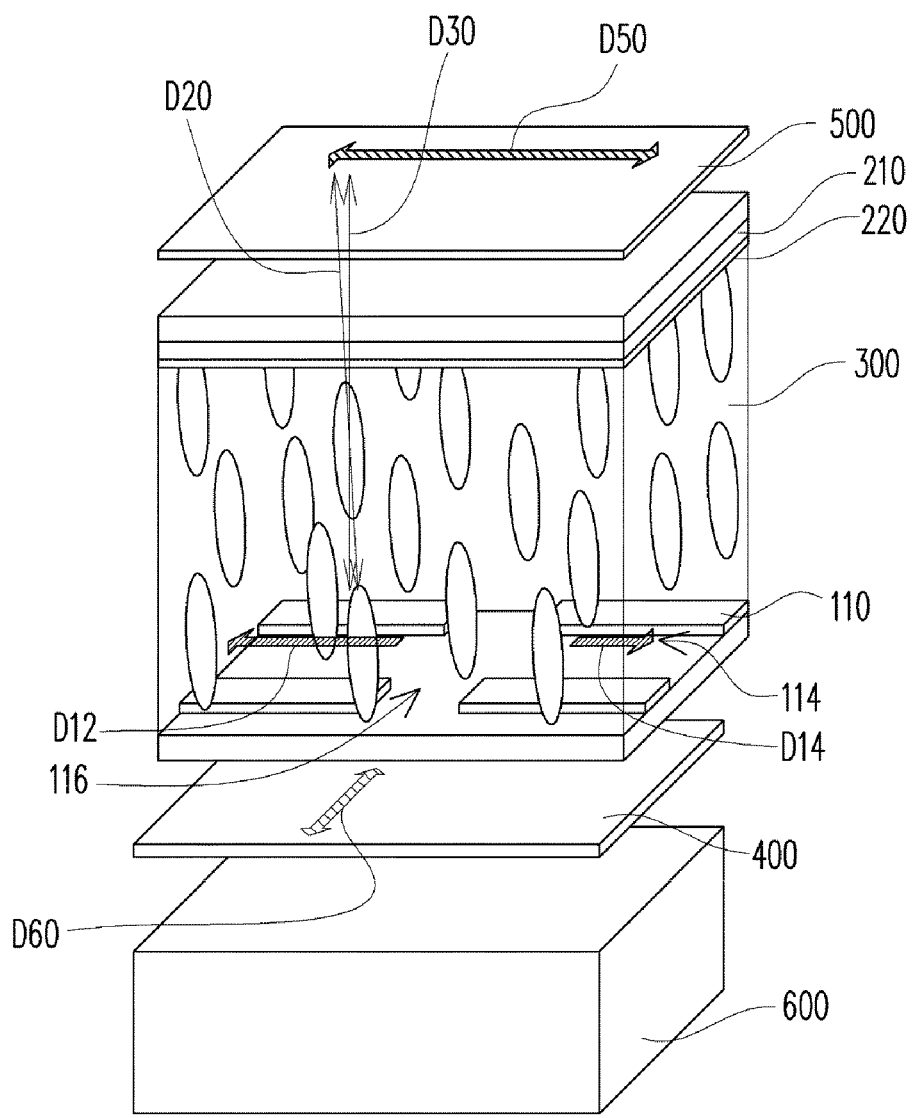
FIG. 3A and FIG. 3B are partial 3D views of a single pixel region of the LCD of FIG. 1.
Figure 3B:
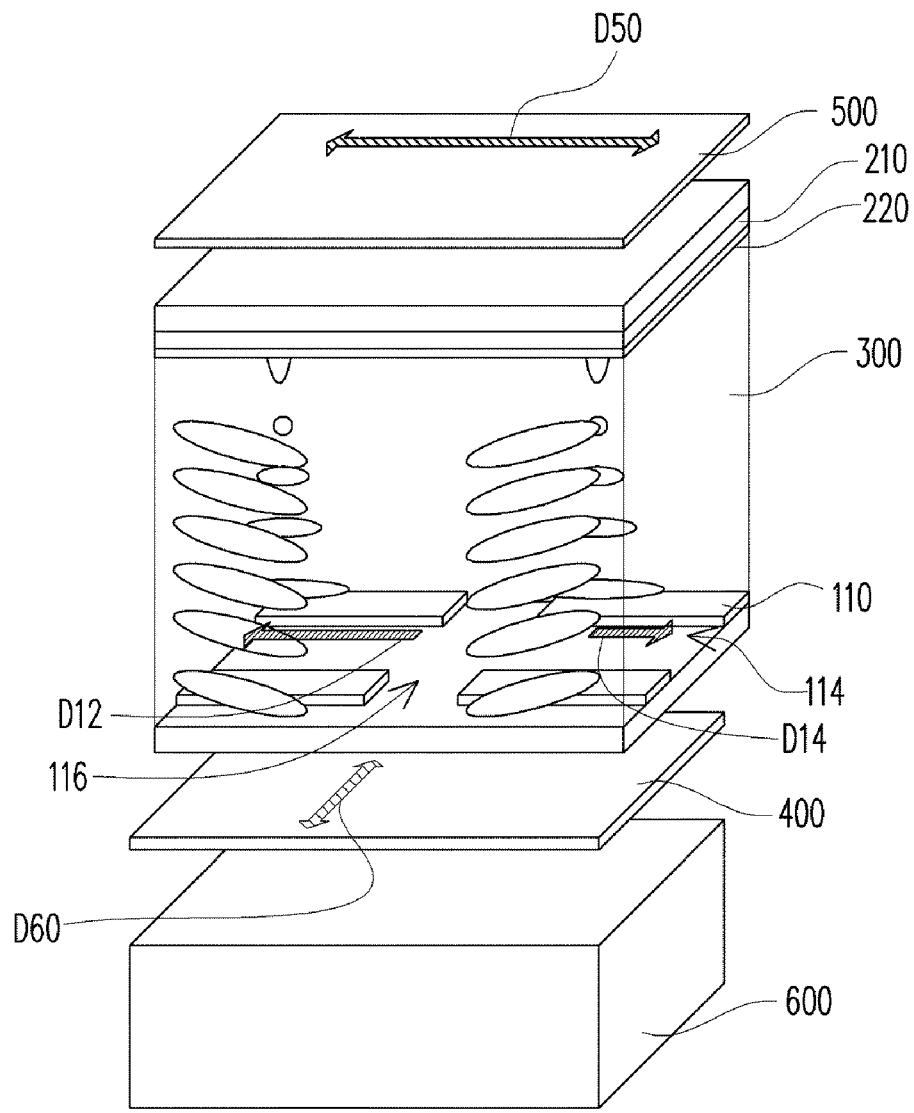

FIG. 2 is a partial top view of a first substrate of the LCD of FIG. 1, and FIG. 3A and FIG. 3B are partial 3D views of a single pixel region of the LCD of FIG. 1, wherein FIG. 3A shows the state of liquid crystal layer not being affected by the electric field and FIG. 3B show the state of liquid crystal layer being affected by the electric field.

Referring to FIGS. 2, 3A and 3B, the first substrate 100 includes a plurality of pixel electrodes 110. Each pixel electrode 110 is respectively disposed on a pixel region P10, and each pixel electrode 110 has a plurality of first slits 112, a plurality of second slits 114, and a third slit 116. The first slits 112 and the second slits 114 are connected to the third slit 116. The first slits 112 stretch along a vector D12 (parallel to the X-axis in FIG. 3A). The vector D12 is with a starting point of a junction of the first slit 112 and the third slit 116. The second slits 114 stretch along a vector D14 (parallel to the X-axis in FIG. 3A). The vector D14 is with a starting point of a junction of the second slit 114 and the third slit 116. Moreover, the first substrate 100, for example, further has a plurality of scan lines 120 (only one line is shown in FIG. 2), a plurality of data lines 130 and a plurality of active devices 140. The pixel region P10 is defined by the scan line 120 and the data line 130. The active device 140 is electrically connected to the corresponding scan line 120, data line 130 and pixel electrode 110. The active device 140 is driven by corresponding scan line 120, and the pixel electrode 110 receives the signals transmitted by the corresponding data line 130 through the active device 140.

The liquid crystal layer 300 is disposed between the first substrate 100 and the alignment layer 220 of the second substrate 200. The pixel electrodes 110 are disposed on the surface of the first substrate 100 facing toward the liquid crystal layer 300. The alignment layer 220 vertically aligns the liquid crystal layer 300. That is, when the liquid crystal molecules of the liquid crystal layer 300 are not affected by the electric field, it is arranged approximately perpendicular to the surface of the second substrate 200, as shown in FIG. 3A. Meanwhile, the alignment layer 220 also pre-tilts the liquid crystal molecules of the liquid crystal layer 300 nearby. According to the present embodiment, each pixel region P10 is divided into a first region P12 and a second region P14, wherein the long-axis of the pre-tilted liquid crystal molecules disposed in the first region P12 is parallel to a direction D20. The vector D12 is substantially perpendicular to the direction D20, and the projection direction of the long-axis of the pre-tilted liquid crystal molecules on the second substrate 200 (i.e. X-Y plane) is parallel to the Y-axis. In addition, an included angle between the long-axis of the pre-tilted liquid crystal molecules (i.e. the direction D20) and the direction D30 of the normal of the second substrate 200 (i.e. the direction parallel to the Z-axis of FIG. 3A) can be larger than 0° and smaller than or equal to 15°. The included angle can certainly be other degree. The object of pre-tilting the liquid crystal molecules of the liquid crystal layer 300 along the direction D20 is to allow the liquid crystal molecules tilting toward the same direction when the liquid crystal molecules are affected by the electric field to tilt.

It should be noted that, from the view perpendicular to the second substrate 200, the long-axis of the pre-tilted liquid crystal molecules disposed in the first region P12 tilts toward the common boundary line between the first region P12 and the second region P14. That is, the projection of the long-axis of the liquid crystal molecules on the second substrate 200 can form a vector A12 with a starting point at an end of the liquid crystal molecules near the alignment layer 220 (as shown in FIG. 1). Moreover, from the view perpendicular to the second substrate 200, the long-axis of the pre-tilted liquid crystal molecules disposed in the second region P14 tilts toward the common boundary line between the first region P12 and the second region P14. That is, the projection of the long-axis of the liquid crystal molecules on the second substrate 200 can form a vector A14 with a starting point at an end of the liquid crystal molecules near the alignment layer 220 (as shown in FIG. 1). In other words, the long-axes of the pre-tilted liquid crystal molecules disposed in the first region P12 and the second region P14 tilt toward the different side of the common boundary line between the first region P12 and the second region P14.

Certainly, the long-axis of the pre-tilted liquid crystal molecules disposed in the first region P12 can also tilt toward the direction away from the common boundary line between the first region P12 and the second region P14 and the long-axis of the pre-tilted liquid crystal molecules disposed in the second region P14 tilts toward the direction away from the common boundary line between the first region P12 and the second region P14. The design allows two tilting directions for the liquid crystal molecules in the single pixel region P10 when the liquid crystal molecules are affected by the electric field such that the symmetry of viewing angle of the LCD 1000 is improved. With proper design, the liquid crystal molecules in the single pixel region P10 can have various tilting directions.

In terms of the method of manufacturing the alignment layer 220, a brush can be used to rub the alignment layer 220 along the direction of vector A12 and vector A14 so that trenches for the liquid crystal molecules to pre-tilt can be formed on the alignment layer 220. Alternatively, the structure of molecules of the alignment layer 220 can also be aligned by a photo-alignment method. In the photo-alignment method, an alignment angle for the liquid crystal molecules depends on an incident angle of an alignment beam, and also pre-tilting effects in two different directions can also be achieved.

The stretching direction D40 of the third slit 116 is described as being perpendicular to the vector D12 as an example, and should not limit the present disclosure. In the present embodiment, the alignment layer 220 is aligned along a direction parallel to the stretching direction D40 of the third slit 116 such that the projection direction of the long-axis of the pre-tilted liquid crystal molecules on the first substrate 100 is parallel to the Y-axis.

In the present embodiment, the first polarizer 400 and the second polarizer 500 are linear polarizers. The absorption direction D60 of the first polarizer 400 and the absorption direction D50 of the second polarizer 500, for example, are substantially mutually-perpendicular. As shown in FIG. 3A, since the liquid crystal molecules of the liquid crystal layer 300 in the present embodiment are arranged approximately perpendicular to the first polarizer 400 when the liquid crystal molecules are not affected by the electric field, the polarization direction of a light passing through the first polarizer 400 will not changed by the liquid crystal layer 300 and can not pass through the second polarizer 500. That is, the LCD 1000 of FIG. 3A is in the dark state.

As shown in FIG. 3B, when the liquid crystal molecules of the liquid crystal layer 300 are rotated by the electric field effect, the polarization direction of a light passing through the first polarizer 400 will be affected by a change of the liquid crystal layer 300 and able to pass through the second polarizer 500. That is, the LCD 1000 of FIG. 3B is in the white state. In addition, the absorption direction D50 of the second polarizer 500, for example, is perpendicular to the vector D12. That is, the absorption direction D50 is parallel to the X-axis but it should not limit the present disclosure.

Figure 4:
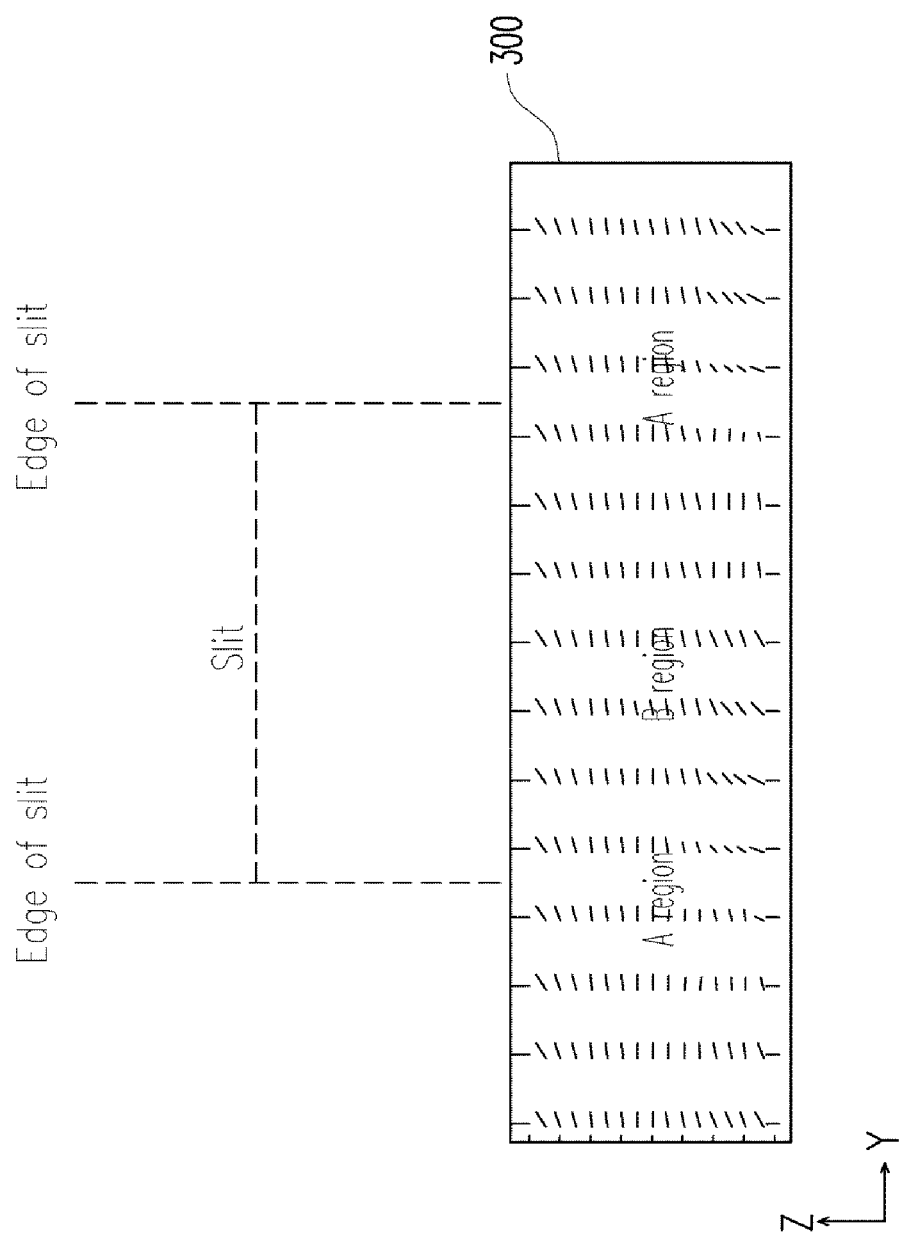
FIG. 4 is a cross-sectional view along I-I line in FIG. 2 shown on the Y-Z plane, illustrating a liquid crystal layer of the LCD of FIG. 3B.

FIG. 4 is a cross-sectional view along I-I line in FIG. 2 shown on the Y-Z plane, illustrating the liquid crystal layer of the LCD of FIG. 3B, wherein the simulate arrangement state of the liquid crystal molecules is illustrated. Referring to FIGS. 3B and 4, when the liquid crystal layer 300 is affected by the electric field, the liquid crystal molecules on the edge of the first slits 112 are affected by two directions of electric fields. One electric field is between the common electrode 210 and the pixel electrode 110. The other electric field is between the pixel electrodes 110 on the two sides of the first slits 112. The liquid crystal molecules near the common electrode 210 are mainly affected by the electric field between the common electrode 210 and the pixel electrode 110, and are aligned by the alignment layer. Therefore, the long-axis of the liquid crystal molecules on the edge of the first slits 112 is approximately parallel to the X-axis, and the long-axis of the liquid crystal molecules near the common electrode 210 is approximately parallel to the Y-axis, as shown in the A region in FIG. 4. Based on the above, in the A region corresponding to the edge of the first slits 112, the action mode of the liquid crystal molecules is a twisted nematic mode.

Referring to FIGS. 3B and 4, when the liquid crystal layer 300 is affected by the electric field, the liquid crystal molecules in the middle of the first slit 112 and the liquid crystal molecules in the middle of the pixel electrode 110 between the first slits 112 (i.e. the liquid crystal molecules corresponding to the B region in FIG. 4) will act in a vertically alignment mode for being squeezed by the liquid crystal molecules on the edge of the first slit 112. More particularly, the projection of the long-axis of the liquid crystal molecules in the B region near the first substrate 100 on the X-Y plane is approximately at an angle of 45° to the X-axis.

Since the action mode of the liquid crystal molecules of each pixel region P10 includes a twisted nematic mode and a vertical alignment mode, the LCD 1000 of the present embodiment has the advantages of lower luminance in the dark state, high contrast, high light transmittance, higher responsive speed and minor color shift, etc. Besides, since the tilting-directions of the liquid crystal molecules of the first region P12 and the second region P14 are different, the symmetry of the viewing angle of the LCD 1000 of the present embodiment can be further improved.

Figure 5:
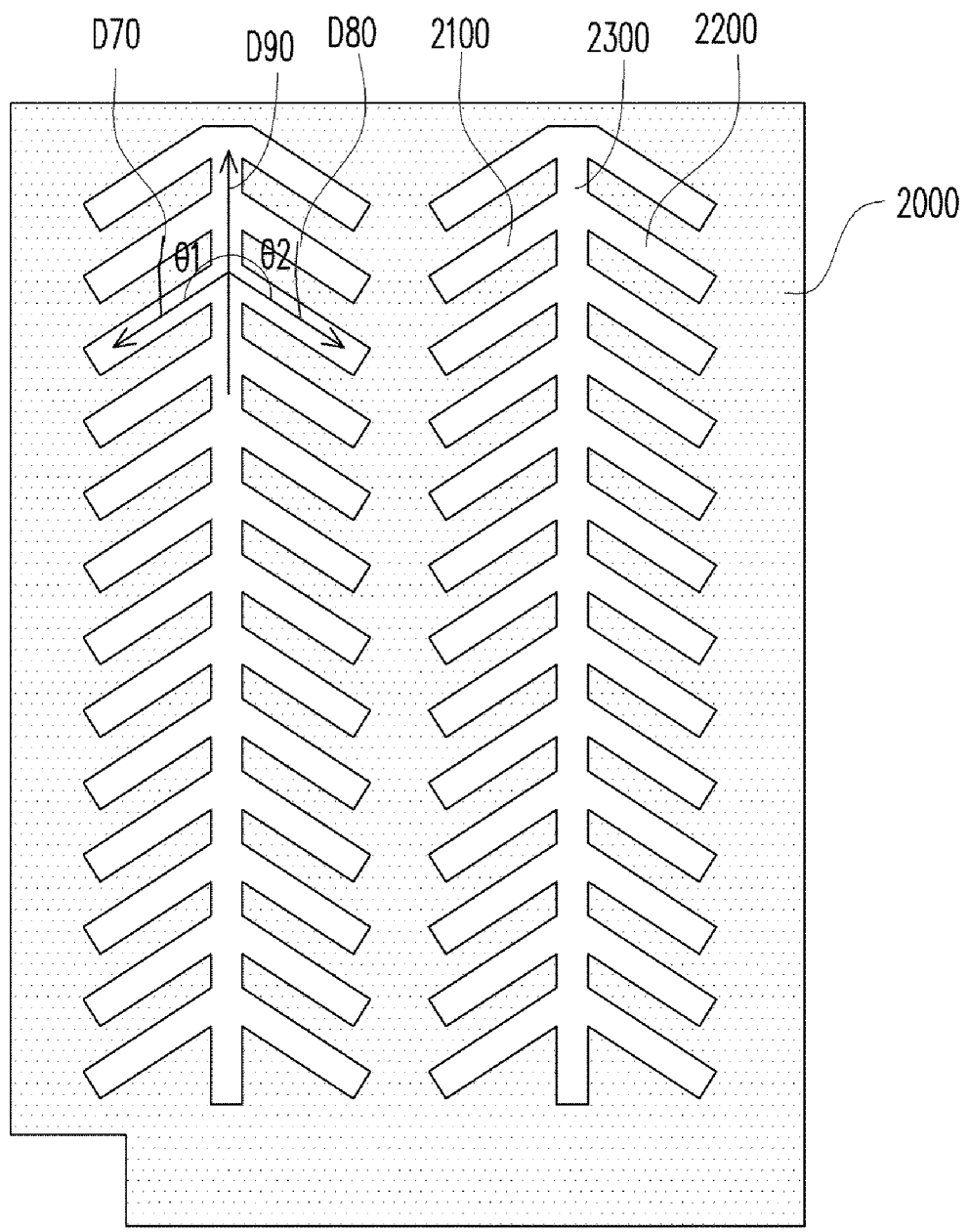
FIG. 5 is a schematic view of a single pixel region in an LCD according to another embodiment of the present disclosure.
Figure 6B:
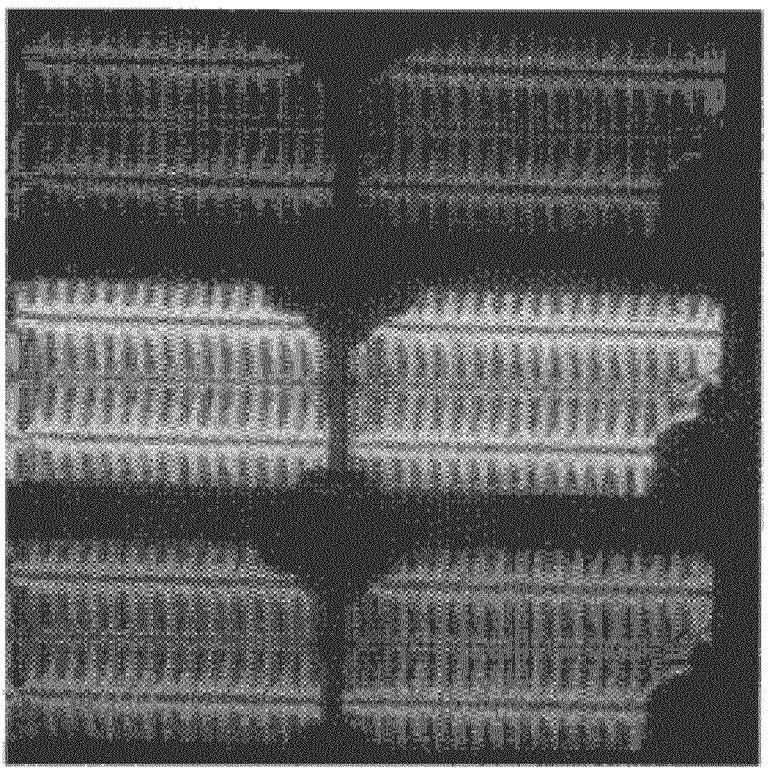
FIGS. 6A-6E are schematic views of the transmittance of the LCD adopting a pixel electrode of FIG. 5 in different θ1 and θ2.
Figure 6A:
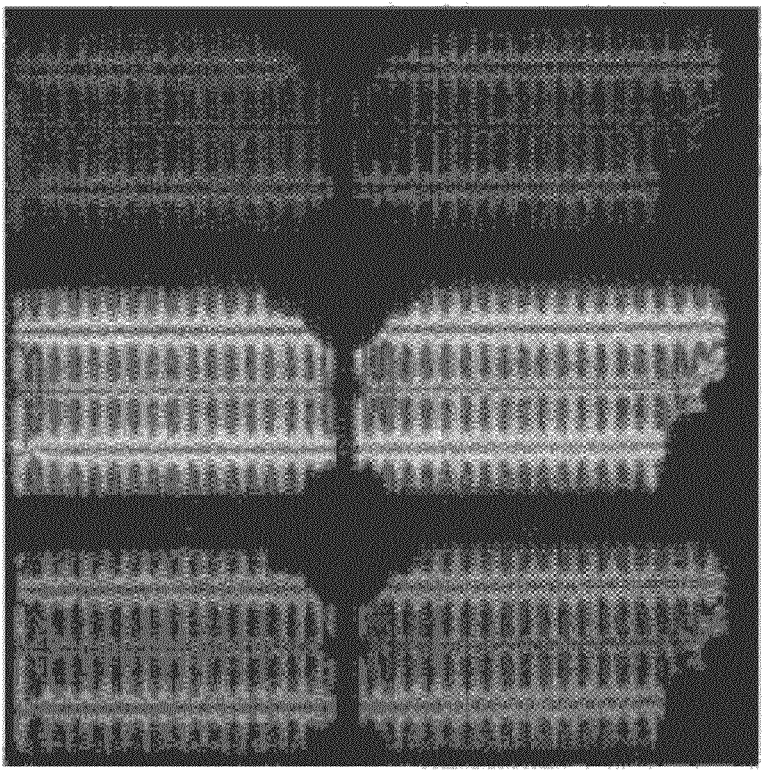
Figure 6C:
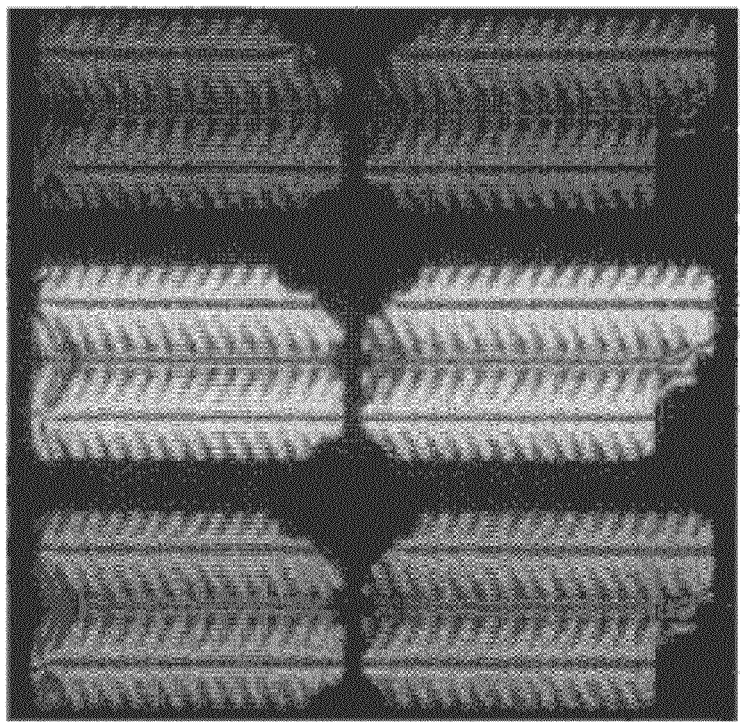
Figure 6D:
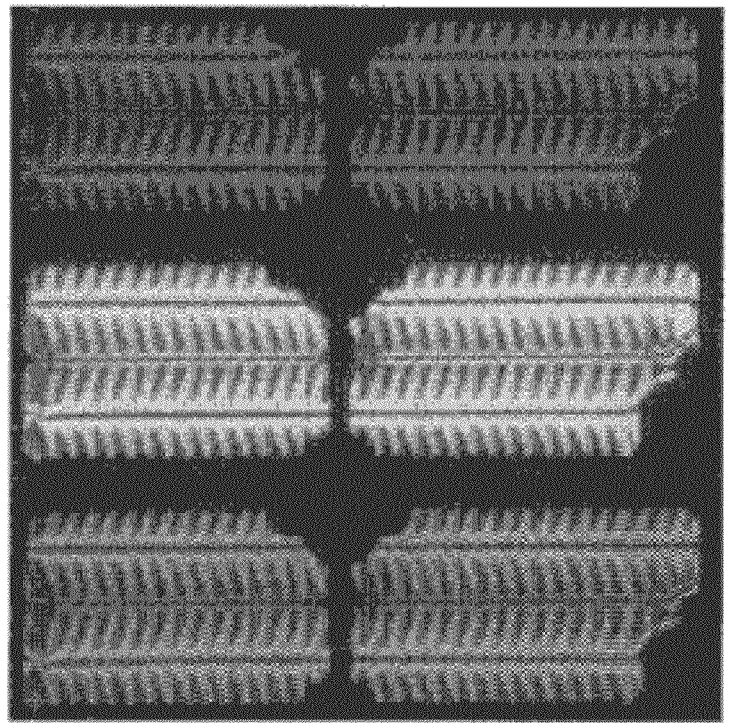
Figure 6E:
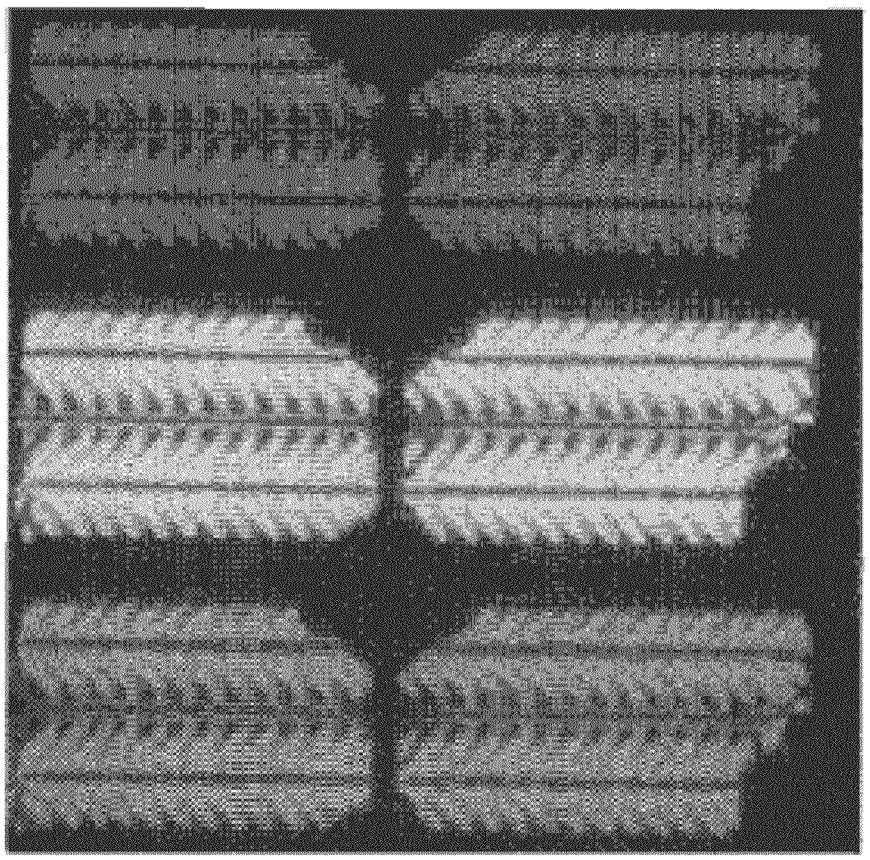

FIG. 5 is a schematic view of a single pixel region in an LCD according to another embodiment of the present disclosure. The difference between the LCD of the present embodiment and that of the previous embodiment lies in the distribution of slits on a pixel electrode. Referring to FIG. 5, a pixel electrode 2000 includes a plurality of first slits 2100, a plurality of second slits 2200, and two third slits 2300. The number of the third slit 2300 can be one or more. The first slit 2100 stretches along a vector D70 with a starting point of a junction of the first slit 2100 and the third slit 2300. The second slit 2200 stretches along a vector D80 with a starting point of a junction of the second slit 2200 and the third slit 2300. The projection of the long-axis of the pre-tilted liquid crystal molecules (not shown) aligned by an alignment layer (not shown) on the pixel electrode 2000 forms a vector D90 with a starting point at an end of the liquid crystal molecules near the alignment layer. An included angle between the vector D90 and the vector D70 is θ1, and an included angle between the vector D90 and vector D80 is θ2, wherein 90°<θ1<160° and 90°<θ2<160°. FIGS. 6A-6E are schematic views of the transmittance of an LCD adopting the pixel electrode of FIG. 5 with different θ1 and θ2. θ1 and θ2 are both 90°, 95°, 105°, 120°, and 135° in FIGS. 6A-6E respectively. It can be known from FIGS. 6A-6E that the larger the θ1 and θ2 are, the better transmittance of the LCD will be.

A preferable range of angles is 120°<θ1<150° and 120°<θ2<150°. Besides, θ1 is not limited to be equal to θ2. Additional, the liquid crystal molecules of a pixel region (not shown) corresponding to the pixel electrode 2000 of the present embodiment all pre-tilt toward the same direction, and as described in previous embodiment, the liquid crystal molecules in the single pixel region can have various tilting directions.

Figure 7:
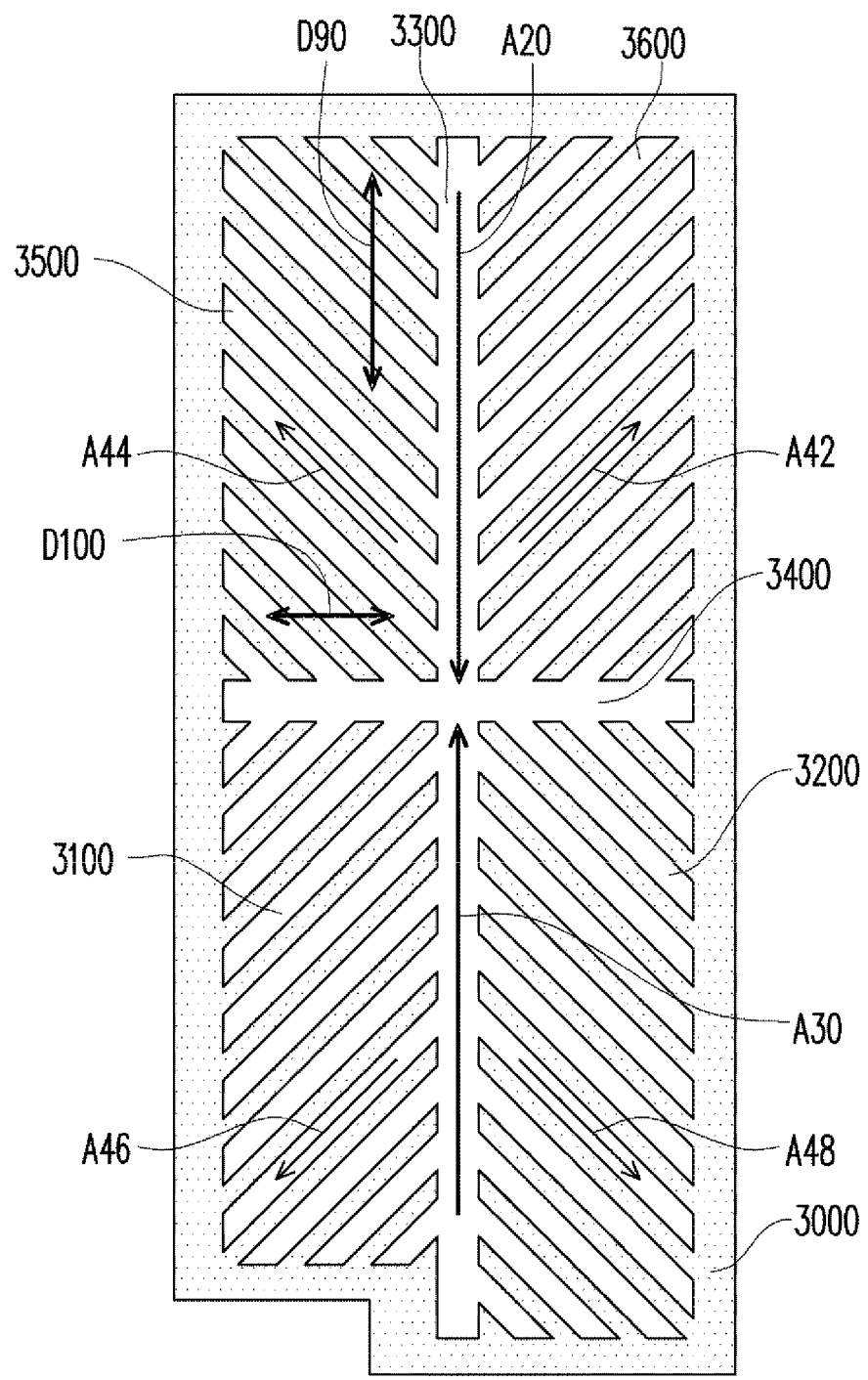
FIG. 7 is a schematic view of a single pixel electrode in an LCD according to another embodiment of the present disclosure.

FIG. 7 is a schematic view of a single pixel electrode in an LCD according to another embodiment of the present disclosure. The difference between the pixel electrode of the LCD of the present embodiment and the pixel electrode of FIG. 5 lies in the distribution of slits. Referring to FIG. 7, besides first slits 3100, second slits 3200, and a third slit 3300, a pixel electrode 3000 can further include at least one fourth slit 3400, a plurality of fifth slits, and a plurality of sixth slits 3600. The fourth slit 3400 stretches along a direction D100 substantially perpendicular to a vector D90 and connects the first slits 3100 and the second slits 3200. More specifically, the pixel electrode 3000 is divided into four quadrants by the third slit 3300 and the fourth slit 3400. Sixth slits 3600 are distributed in a first quadrant, fifth slits 3500 are distributed in a second quadrant, first slits 3100 are distributed in a third quadrant, and second slits 3200 are distributed in a fourth quadrant. In addition, the projection of the long-axis of the pre-tilted liquid crystal molecules aligned by an alignment layer (not shown) in the first and second quadrants on the pixel electrode 3000 can form a vector A20 with a starting point at an end of the liquid crystal molecules near the alignment layer, and the projection of the long-axis of the pre-tilted liquid crystal molecules aligned by the alignment layer in the third and fourth quadrants on the pixel electrode 3000 can form a vector A30 with a starting point at an end of the liquid crystal molecules near the alignment layer. Certainly, the liquid crystal molecules in the first and the third quadrants can also tilt toward the same direction while the liquid crystal molecules in the second and the fourth quadrants tilt toward another direction.

As afore-mentioned, the vector A20 formed by the pre-tilting direction of the liquid crystal molecules in the first and second quadrants and a vector A42 formed by the sixth slit 3600 form an obtuse angle, and the vector A20 formed by the pre-tilting direction of the liquid crystal molecules in the first and second quadrants and a vector A44 formed by the fifth slit 3500 form an obtuse angle. The vector A30 formed by the pre-tilting direction of the liquid crystal molecules in the third and fourth quadrants and a vector A46 formed by the first slit 3100 form an obtuse angle, and the vector A30 formed by the pre-tilting direction of the liquid crystal molecules in the third and fourth quadrants and a vector A48 formed by the second slit 3200 form an obtuse angle. There are two pre-tilting directions of the liquid crystal molecules. Thus, the LCD of the present embodiment not only has high transmittance but also good symmetry of the viewing angle.

Based on the above, in the LCD of the present embodiment, by the design of forming an obtuse angle between the pre-tilting direction of the liquid crystal molecules and the slits, the rotating angle of the liquid crystal molecules acting in a twisted nematic mode can be nearly 90° such that the transmittance of each pixel region is improved. Besides, by forming an alignment layer which allows the liquid crystal molecules in each pixel region having two different pre-tilting directions, the symmetry of the arrangement of the liquid crystal molecules in the single pixel region can be improved, and thus the symmetry of the viewing angle of the LCD can also be improved.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A liquid crystal display, having at least one pixel region and comprising:
a first substrate having at least one pixel electrode, wherein the pixel electrode is disposed in the pixel region and has a plurality of first slits, a plurality of second slits and at least one third slit, the first slits and the second slits are connected to the third slit, each first slit stretches along a first vector with a starting point in a junction of the first slit and the third slit, and each second slit stretches along a second vector with a starting point in a junction of the second slit and the third slit;
a second substrate, having a common electrode and an alignment layer, wherein the common electrode is covered by the alignment layer; and
a liquid crystal layer disposed between the pixel electrode of the first substrate and the alignment layer of the second substrate, wherein liquid crystal molecules of the liquid crystal layer near the alignment layer are aligned by the alignment layer to pre-tilt, each projection of the long-axis of at least part of the pre-tilted liquid crystal molecules on the second substrate forms a third vector with a starting point at the end of the liquid crystal molecule near the alignment layer, the third slit is parallel to the direction of the third vector, an included angle between the first vector and the third vector is θ1, an included angle between the second vector and the third vector is θ2, 90°<θ1<160°, and 90°<θ2<160°, an included angle between the long-axis of the pre-tilted liquid crystal molecules and the direction of the normal of the second substrate is larger than 0° and smaller than or equal to 15°.

2. The liquid crystal display of claim 1, wherein 120°<θ1<150° and 120°<θ2<150°.

3. The liquid crystal display of claim 1, wherein θ1=θ2.

4. The liquid crystal display of claim 1, wherein the pixel region is divided into a first region and a second region, the projection of the long-axis of the pre-tilted liquid crystal molecules disposed in the first region on the second substrate forms the third vector with a starting point at an end of the liquid crystal molecules near the alignment layer, the projection of the long-axis of the pre-tilted liquid crystal molecules disposed in the second region on the second substrate forms a fourth vector with a starting point at an end of the liquid crystal molecules near the alignment layer, the direction of the third vector is parallel to the direction of the fourth vector, and the third vector and the fourth vector are toward the common boundary line between the first region and the second region.

5. The liquid crystal display of claim 4, wherein the first slits and the second slits are disposed in the first region, the pixel electrode further has a plurality of fifth slits and a plurality of sixth slits, the fifth slits and the sixth slits are disposed in the second region and respectively connected to the third slit, each fifth slit stretches along a fifth vector with a starting point of a junction of the fifth slit and the third slit, each sixth slit stretches along a sixth vector with a starting point of a junction of the sixth slit and the third slit, an included angle between the third vector and the fifth vector is $\theta 5$, an included angle between the third vector and the sixth vector is $\theta 6$, $90°<\theta 5<160°$, and $90°<\theta 6<160°$.

6. The liquid crystal display of claim 1, further comprising a first polarizer disposed on a surface of the first substrate away from the liquid crystal layer and a second polarizer that is disposed on a surface of the second substrate away from the liquid crystal layer.

7. The liquid crystal display of claim 6, wherein absorption directions of the first polarizer and the second polarizer are substantially mutually-perpendicular.

8. The liquid crystal display of claim 1, wherein the first substrate is an active device array substrate.

9. The liquid crystal display of claim 8, wherein the first substrate further has at least one color filter disposed in the pixel region.

10. The liquid crystal display of claim 1, wherein the second substrate further has at least one color filter disposed in the pixel region.

11. The liquid crystal display of claim 1, further comprising a backlight module on which the first substrate, the second substrate, and the liquid crystal layer are disposed.

12. The liquid crystal display of claim 1, wherein the liquid crystal molecules of the liquid crystal layer are a negative type of liquid crystal molecules.

13. A liquid crystal display, having at least one pixel region and comprising:
   a first substrate having at least one pixel electrode, wherein the pixel electrode is disposed in the pixel region and has a plurality of first slits, a plurality of second slits and at least one third slit, the first slits and the second slits are connected to the third slit, each first slit stretches along a first vector with a starting point in a junction of the first slit and the third slit, and each second slit stretches along a second vector with a starting point in a junction of the second slit and the third slit;
   a second substrate, having a common electrode and an alignment layer, wherein the common electrode is covered by the alignment layer; and
   a liquid crystal layer disposed between the pixel electrode of the first substrate and the alignment layer of the second substrate, wherein liquid crystal molecules of the liquid crystal layer near the alignment layer are aligned by the alignment layer to pre-tilt, each projection of the long-axis of at least part of the pre-tilted liquid crystal molecules on the second substrate forms a third vector with a starting point at the end of the liquid crystal molecule near the alignment layer, the third slit is parallel to the direction of the third vector, an included angle between the first vector and the third vector is $\theta 1$, an included angle between the second vector and the third vector is $\theta 2$, $90°<\theta 1<160°$, and $90°<\theta 2<160°$, wherein the pixel region is divided into a first region and a second region, the projection of the long-axis of the pre-tilted liquid crystal molecules disposed in the first region on the second substrate forms the third vector with a starting point at an end of the liquid crystal molecules near the alignment layer, the projection of the long-axis of the pre-tilted liquid crystal molecules disposed in the second region on the second substrate forms a fourth vector with a starting point at an end of the liquid crystal molecules near the alignment layer, the direction of the third vector is parallel to the direction of the fourth vector, and the third vector and the fourth vector are toward the common boundary line between the first region and the second region, wherein the first slits and the second slits are disposed in the first region, the pixel electrode further has a plurality of fifth slits and a plurality of sixth slits, the fifth slits and the sixth slits are disposed in the second region and respectively connected to the third slit, each fifth slit stretches along a fifth vector with a starting point of a junction of the fifth slit and the third slit, each sixth slit stretches along a sixth vector with a starting point of a junction of the sixth slit and the third slit, an included angle between the third vector and the fifth vector is $\theta 5$, an included angle between the third vector and the sixth vector is $\theta 6$, $90°<\theta 5<160°$, and $90°<\theta 6<160°$, wherein $90°<\theta 1<160°$, $90°<\theta 2<160°$, and the pixel electrode further has a fourth slit disposed on the common boundary line between the first region and the second region and stretching along the direction substantially perpendicular to the third vector.

* * * * *